Figure 1:
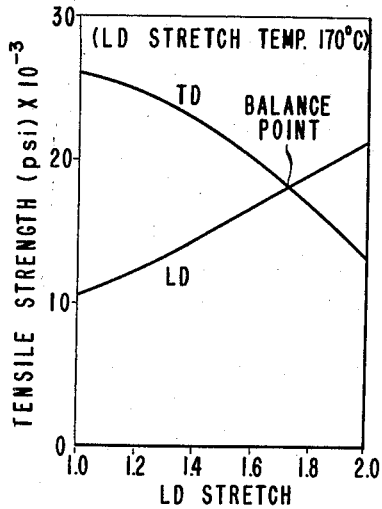

(EXAMPLE X)
TD AND LD TENSILE STRENGTH
VS.
LD STRETCH FOR PREVIOUSLY 3-3.9X
TD STRETCHED, CRYSTALLIZED FILM (EXAMPLE XI)
TD AND LD TENSILE STRENGTH
VS.
LD STRETCH FOR PREVIOUSLY 3-3.9X
TD STRETCHED, CRYSTALLIZED FILM (EXAMPLE XII)
TD AND LD TENSILE STRENGTH
VS.
LD STRETCH FOR PREVIOUSLY 3-3.9X
TD STRETCHED, CRYSTALLIZED FILM

INVENTOR
LeROY FREDERICK GRONHOLZ

BY
ATTORNEY

Jan. 17, 1961
LE ROY F. GRONHOLZ
PROCESS FOR BIAXIALLY ELONGATING
THERMOPLASTIC POLYMERIC FILMS
2,968,065
Filed Dec. 12, 1957
2 Sheets-Sheet 2
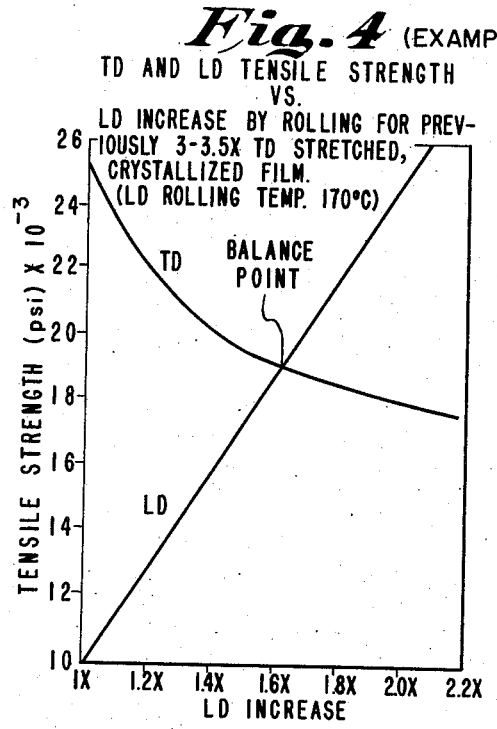
Fig. 4 (EXAMPLE XXIII)
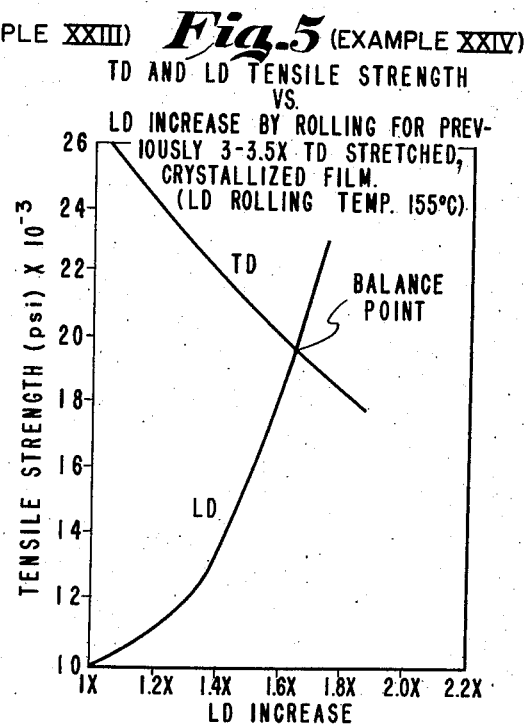
Fig. 5 (EXAMPLE XXIV)
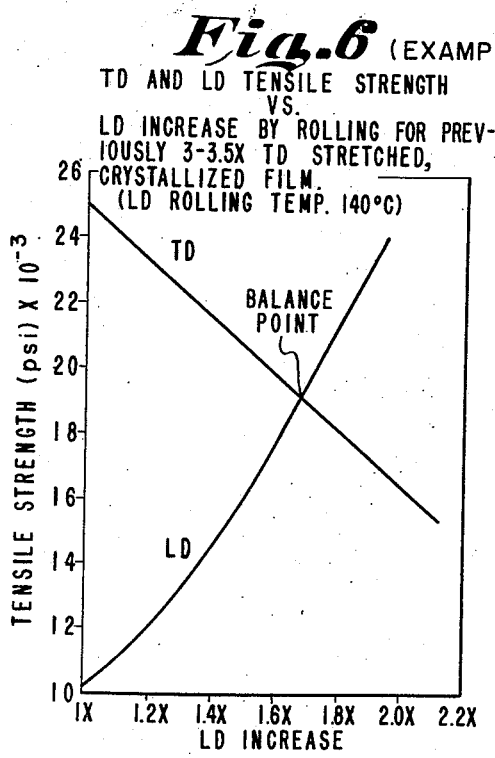
Fig. 6 (EXAMPLE XXV)
INVENTOR
LeROY FREDERICK GRONHOLZ
BY *Herbert M. Olson*
ATTORNEY

United States Patent Office 2,968,065
Patented Jan. 17, 1961

2,968,065
PROCESS FOR BIAXIALLY ELONGATING THERMOPLASTIC POLYMERIC FILMS

Le Roy Frederick Gronholz, Kenmore, N.Y., assignor to E. I. du Pont de Nemours and Company, Wilmington, Del., a corporation of Delaware Filed Dec. 12, 1957, Ser. No. 702,329

20 Claims. (Cl. 18—48)

This invention relates to a new process for improving the properties of crystallizable, thermoplastic polymeric films. More particularly, it relates to a process that is easily adapted to continuous operation for orienting crystallizable, thermoplastic, polymeric films.

Crystallizable polymers, as used in this specification, refer to those synthetic, linear, organic polymers that are obtainable in a substantially amorphous state and are capable of being converted to crystalline form upon heating to temperatures above the second order transition temperature as defined hereinafter. The substantially amorphous material is usually obtained by quenching the molten polymer. Crystallizable polymers for purposes of the present invention include polyethylene terephthalate, polyhexamethylene adipamide, polycaproamide, polyhexamethylene sebacamide, polyethylene-2,6- and 1,5-naphthalate, polytetramethylene-1,2-dioxybenzoate and copolymers of ethylene terephthalate and ethylene isophthalate. The invention will be described primarily as it refers to films of polyethylene terephthalate, but it should be understood that the invention is applicable to films of the crystallizable polymers in general.

It is known that polyethylene terephthalate film in the unoriented state, whether amorphous or crystalline, exhibits weaknesses placing the film at a disadvantage with competitive films and fabrics. The tensile strength, impact strength, flex life, etc., are relatively low; vapor permeabilities, moisture and organic vapors, are relatively high. By orienting this film in processes involving elongating the initially amorphous polyethylene terephthalate film in at least one direction, substantial improvements in the above-mentioned properties have been observed. It has also been found that by elongating polyethylene terephthalate film in the usual two mutually perpendicular directions (longitudinal and transverse), an improved film is obtained displaying substantially improved tensile properties in both directions. By adding a heating step while maintaining the biaxially elongated film under tension in both longitudinal and transverse directions, the property of dimensional stability is added to the already much improved film.

To produce the biaxially elongated, dimensionally stable polyethylene terephthalate film, the prior art processes involve elongating a substantially amorphous polyethylene terephthalate film in both the longitudinal and transverse directions, usually at least 2.5X where X is the original dimension, at a temperature above the second order transition temperature but not more than about 50° above this temperature.[1] The film elongated in two directions at the aforementioned temperature is then heated to a temperature of 150°–225° C. in an apparatus such as a tenter frame where shrinkage is prevented.

Adapting the above-described process to continous operation is fraught with difficulties. Immediately apparent is the limitation placed upon the speed of the process by the final heating step, the so-called heat-setting step, as performed in the tentering apparatus. Since no elongation of the film can occur during this step, the linear rate of travel is obviously much less than it would be if elongation in the longitudinal direction were occurring during this step. Attempts to perform the second elongation during this heat-setting step as in a rolling operation have been unsuccessful. Rolling at the high temperature required tends to destroy the orientation of the film in the previously elongated direction.

An object of the present invention is a process for biaxially elongating polymeric film. A further object is a process of providing an improved, substantially "balanced" (substantially equivalent tensile properties in both directions) polymeric film. Another object is a process of producing a film having enhanced uni-directional properties, e.g., low elongation, high tensile strength. Still another object is an economical continuous process for biaxially elongating polymeric film. Other objects will appear hereinafter.

The objects are accomplished by a process comprising the steps, in sequence, of elongating a substantially amorphous, crystallizable, polymeric film in one direction at a temperature $T_1$ between the second order transition temperature of the film and about 35° C. above it; thereafter subjecting the film to a temperature within a range of about 25° C. above $T_1$ to just below the crystalline melting temperature range of the film while restricting dimensional change of the film, i.e., restraining shrinkage of the film by maintaining tension on the film; and thereafter elongating the film in a direction at right angles to the direction of previous elongation at a temperature within a range of about 130° C. below to about 30° C. below the crystalline melting temperature range.

The crystalline melting temperature range denotes a range starting with the temperature at which the crystalline structure begins to disappear at an appreciable rate and extending to an upper temperature at which crystallites are no longer evident by X-ray examination. For polyethylene terephthalate, the crystalline melting temperature range extends from 250° C. to 255° C. Its second order transition temperature is 69° C. The second order transition temperatures and the crystalline melting temperature ranges for some of the other crystallizable polymers, to which the process of the present invention applies, are given in Table 1. It will be noted that for some polymers the crystalline melting temperature range narrows to a crystalline melting point.

TABLE I

Second order transition temperatures and crystalline melting temperature ranges of some crystallizable polymers

| Polymer | Second Order Transition Temperature, °C. | Crystalline Melting Temperature Range, °C. |
|---|---|---|
| Polyethylene-2,6-naphthalate | 113 | 265 |
| Polytetramethylene-1,2-dioxybenzoate | 53 | 220 |
| Polyethylene-1,5-naphthalate | 71 | 225 |
| Polyhexamethylene adipamide | 45–50 | 240–250 |
| Polyhexamethylene sebacamide | 45–50 | 240–250 |
| Polycaprolactam | 45–50 | 240–250 |
| Ethylene terephthalate/(70–100%), Ethylene isophthalate (0–30%) copolymer | 51–69 | 170–250 |

[1] The second order transition temperature, as defined in U.S. Patent No. 2,578,899 issued to Pace, is the temperature at which a discontinuity occurs when a first derivative thermo-dynamic quantity is plotted versus temperature. In practice, the second order transition temperature is determined by plotting a curve of linear expansion or specific heat of the polymer against temperature and noting the temperature at which a point of inflection or discontinuity in the curve occurs. This is the second order transition temperature, which, for polyethylene terephthalate, is found to be 69° C. Attempts to elongate polyethylene terephthalate below 69° C. in the processes of the prior art usually result in rupturing the film. Elongating the film above 119° C. (69° C.+50° C.) provides little or no orientation of the polyethylene terephthalate molecules and, consequently, little or no improvement in physical properties.

The process, as it is applied to polyethylene terephthalate film, involves some preferred selections within the ranges defined in the broad statement of the invention. As applied to polyethylene terephthalate film, the process specifically comprises the steps in sequence of elongating a substantially amorphous polyethylene terephthalate film at a temperature of 70°–105° C. at least 2X where X is the original dimension of the film, preferably 2.5X–4X, in one direction; thereafter subjecting the film to a temperature of 150°–250° C. while restricting dimensional change; and thereafter elongating the film in a direction perpendicular to the direction of previous elongation at a temperature of 140°–190° C. Surprisingly, a "balanced" film, i.e., a biaxially elongated film having essentially equivalent tensile properties in both directions, may be produced by elongating in the second direction to a lesser extent than in the direction of previous elongation, preferably 1.3X–1.9X in the second direction compared to 2.5X–4X in the first direction. Since the force per unit increase in dimension required to stretch a crystallizable film in the second direction is usually much higher than such force in the first direction, this surprising result is a substantial contribution, particularly in the production of the thicker gauge films. It has also been found that a film having greatly enhanced uni-directional properties, e.g., exceptionally high modulus, high tenacity and low elongation, in the second direction, may be prepared by elongating in the second direction to a greater extent than in the direction of previous elongation, preferably 4.5X–5.5X compared to 2.5X–4X in the first direction. Furthermore, the present invention enables one to perform the second elongation at substantially higher temperatures than heretofore believed possible, thus adding to the ease with which the step can be performed.

A film produced by any of the processes described above possesses a high degree of dimensional stability which for most film uses is entirely adequate. However, when a film is desired which has an even higher dimensional stability, an additional heat-treating step may be imposed. This step comprises subjecting the film for an instant to a temperature above that at which dimensional stability is desired while holding the film under tension.

The invention will be more clearly understood by referring to the drawing, the examples and the description which follow. In the drawing, Figures 1–6 represent the results of Examples X, XI, XII, XXIII, XXIV and XXV, respectively, and show that "balanced" film properties are obtained by imposing substantially less elongation on the film in the second direction (LD) than in the first (TD). The temperatures indicated in the examples are the ambient temperatures, i.e., the temperature of the atmosphere surrounding the film during stretching or while the film is being held under tension or the temperature of the rolls during rolling.

EXAMPLE I

Amorphous polyethylene terephthalate, prepared in accordance with the general procedure described in U.S. Patent No. 2,465,314 issued to Whinfield and Dickson, was extruded at a temperature of 300° C. through a narrow orifice of an extrusion hopper vertically downward onto a cool drum maintained at 65° C. The gauge or thickness of the quenched film was between 65 and 75 mils.

After quenching, the amorphous, unoriented film was conducted into a closed tenter frame composed essentially of two parallel sets of tenter clips attached to continuously moving endless belts. The tenter clips grasped the edges of the film and as the film moved through the apparatus the clips diverged to stretch the film 3X in a direction transverse to its length. The temperature of the atmosphere surrounding the film during this transverse directional stretching was maintained between 85° C. and 95° C.

At the end of the tentering apparatus the film was passed through a zone wherein the temperature was maintained at 150° C. During this exposure which lasted for about 5 seconds, the film was maintained under constant tension so that dimensional change in either direction was prevented, i.e., the clips did not diverge and the tension on the film in the longitudinal direction was kept constant. The film was then cooled to room temperature and wound up on a wind-up core.

Thereafter, the film was stretched 1.88X in the longitudinal or machine direction in a nip roll stretcher at a temperature of 145° C. This stretching apparatus consisted of a variable tension unwind roll and a set of nip rolls consisting of two rolls heated by a 5 volt induction heater and a driven windup roll. The film was unwound from the unwind roll and passed through the nip of the two heated rolls. The heated rolls were run at the same speed as the unwind roll and were set so that no reduction in the thickness of the film was caused by the pressure of the rolls. The film was then wound up on the driven windup roll which was operated at a speed sufficient to impart a stretch of 1.88X to the film.

The film, 7.6 mils thick, was tested for tensile strength, tensile modulus, tear strength, dimensional stability and elongation. The following results were obtained:

| Property | Longitudinal Direction | Transverse Direction |
|---|---|---|
| Tensile Strength | 19,300 | 17,900 |
| Tensile Modulus | 577,000 | 421,000 |
| Tear Strength | 480 | 507 |
| Percent Shrinkage | +5.0 | 1–2.9 |
| Percent Elongation | 16.5 | 188 |

[1] A negative sign indicates an increase in this dimension.

The following results represent those obtained with a control, an unoriented, amorphous polyethylene terephthalate film. The properties are independent of direction.

Property:
    Tensile strength _____ 8,000
    Tensile modulus _____ 300,000
    Tear strength _____ 20
    Percent shrinkage _____ 0
    Percent elongation _____ 450

Tensile strength, in lbs./square inch, is based upon the initial cross-sectional area of a sample and is determined by elongating the film at a rate of 100% per minute until the sample breaks.

Percent elongation is the percent increase in length of the film at the breaking point.

Tensile modulus, in lbs./square inch, is a measure of the film stiffness and is taken from the slope of the initial or Hookian portion of the stress/strain curve at 1% elongation, the film being elongated at 100% per minute.

Tear strength, in grams/mil of thickness, is the force required to tear the film and is measured on an Elmendorf Tear Tester[1]. The tear tester consists of a stationary jaw, a movable jaw mounted on a pendulum which swings on a frictionless bearing, and means for registering the maximum arc through which the pendulum swings. The film sample is placed between the jaws and the pendulum is released. From the point at which the pendulum stops after tearing the film the tear strength is calculated.

Percent shrinkage is a measure of the dimensional stability or the ability of the film to resist shrinkage at elevated temperatures. A film sample of known dimensions is hung unrestrained for 30 minutes in an oven maintained at about 150° C. and the dimensions remeasured. An increase in a dimension is recorded with a negative sign.

EXAMPLE II

The amorphous polyethylene terephthalate film, 65–75 mils thick, of Example I was conducted through the

[1] Manufactured by the Albert Instrument Corp. of Phila., Pa.

tenter frame at a temperature of 85°–95° C. to stretch the film in the transverse direction between 3X and 3.5X; thereafter the film was exposed to a temperature between 150° C. and 170° C. for about 5 seconds while its dimensions were maintained constant; thereafter the film was stretched 1.72X in the longitudinal direction in a manner similar to that described for Example I at a temperature of 170° C.

The final film, 12.3 mils thick, displayed the following properties:

| Property | Longitudinal Direction | Transverse Direction |
|---|---|---|
| Tensile Strength | 20,200 | 21,300 |
| Tensile Modulus | 447,000 | 471,000 |
| Percent Elongation | 47.5 | 145 |

EXAMPLE III

The amorphous polyethylene terephthalate film, 65–75 mils thick, of Example I was conducted through the tenter frame at a temperature of 85°–95° C. to stretch the film in the transverse direction 3.2X; thereafter the film was exposed to a temperature of 200° C. for about 5 seconds while its dimensions were maintained constant; thereafter the film was stretched 1.68X in the longitudinal direction in a manner similar to that described for Example I at a temperature of 174° C.

The final film, 12.5 mils thick, displayed the following properties:

| Property | Longitudinal Direction | Transverse Direction |
|---|---|---|
| Tensile Strength | 18,700 | 19,600 |
| Tensile Modulus | 595,000 | 531,000 |
| Percent Elongation | 22 | 115 |

EXAMPLE IV

The amorphous polyethylene terephthalate film, 65–75 mils thick, of Example I was conducted through the tenter frame at a temperature of 85°–95° C. to stretch the film in the transverse direction 3.9X; thereafter the film was exposed to a temperature of 200° C. for about 5 seconds while its dimensions were maintained constant; thereafter the film was stretched 1.79X in the longitudinal direction in a manner similar to that described for Example I at a temperature of 170° C.

The final film, 9.8 mils thick, displayed the following properties:

| Property | Longitudinal Direction | Transverse Direction |
|---|---|---|
| Tensile Strength | 19,800 | 19,200 |
| Tensile Modulus | 673,000 | 516,000 |
| Percent Elongation | 37 | 110 |

EXAMPLES V–IX

Amorphous polyethylene terephthalate film was stretched at least 2.5X in the transverse direction at a temperature of 85° C.; then heated to a temperature of 200° C.; and thereafter stretched from 1.5X to 1.9X in the longitudinal direction at the temperatures shown in the accompanying table. The procedure for transverse directional stretching and longitudinal directional stretching was substantially that described in Example I. The percent shrinkage was determined and the results indicated excellent dimensional stability for the film samples produced according to these examples, as shown in Table 2.

TABLE 2

*Effect of LD stretch temperature on dimensional stability of film processed according to the invention*

| Example | Stretch | | Temp. of LD Stretch (° C.) | Dimensional Stability (Percent Shrinkage) | |
|---|---|---|---|---|---|
| | TD | LD | | TD | LD |
| V | 2.6 | 1.5 | 145 | −1.79 | 1.25 |
| VI | 3.4 | 1.8 | 155 | −2.86 | 2.50 |
| VII | 3.4 | 1.5 | 150 | −1.45 | 2.50 |
| VIII | 3.5 | 1.9 | 172 | −1.25 | 2.47 |
| IX | 3.5 | 1.5 | 174 | −1.14 | 0 |

EXAMPLES X–XII

Figure 2:
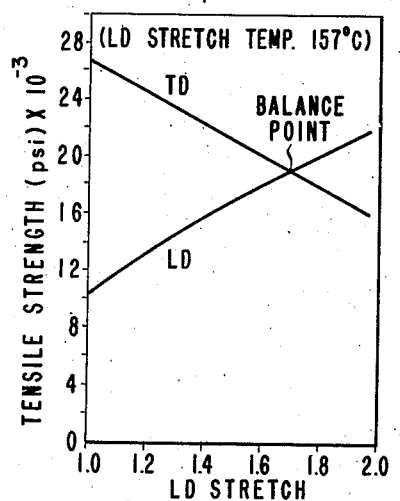
Figure 3:
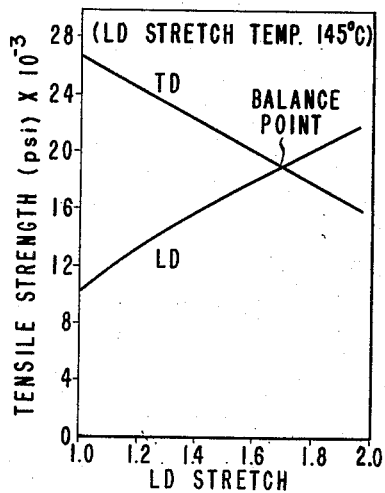

The results of these examples are presented in Tables 3, 4 and 5 and are ploted in the accompanying Figures 1, 2 and 3, respectively. For these examples, a substantially amorphous polyethylene terephthalate film as in Example I was stretched 3X to 3.9X at a temperature between 80° C. and 95° C.; then exposed to a temperature of 200° C. for Examples X and XI, 150° C. for Example XII; and thereafter, stretched amounts varying between 1.1X and 2.0X in the previously described stretching apparatus in the direction perpendicular to the first direction of stretch at a temperature of about 170° C. for Example X; about 157° C. for Example XI; and 145° C. for Example XII.

The tensile strengths or tenacities of the resulting films in both the transverse and longitudinal directions were determined and were ploted versus the amount of stretch in the longitudinal direction. It will be noted from Figures 1, 2 and 3 that despite the fact that the amount of stretch in the transverse direction had been more than 3X, balanced tenacities were obtained with longitudinal direction stretching of only about 1.7X in all cases.

TABLE 3

*Effect of amount of LD stretch on tensile strength of previously TD stretched film processed according to Example X*

| LD Stretch Ratio | Tensile Strength | |
|---|---|---|
| | LD | TD |
| 1.0 | 11,300 | 26,000 |
| 1.34 | 13,600 | 22,800 |
| 1.56 | 16,500 | 22,000 |
| 1.68 | 17,600 | 18,800 |
| 1.74 | 18,400 | 18,900 |
| 1.78 | 19,600 | 19,200 |
| 1.92 | 20,200 | 17,100 |

TABLE 4

*Effect of amount of LD stretch on tensile strength of previously TD stretched film processed according to Example XI*

| LD Stretch Ratio | Tensile Strength | |
|---|---|---|
| | LD | TD |
| 1.4 | 15,600 | 24,000 |
| 1.6 | 18,000 | 18,800 |

TABLE 5

*Effect of amount of LD stretch on tensile strength of previously TD stretched film processed according to Example XII*

| LD Stretch Ratio | Tensile Strength | |
| --- | --- | --- |
| | LD | TD |
| 1.0 | 10,100 | 26,400 |
| 1.1 | 11,600 | 25,000 |
| 1.32 | 14,800 | 22,900 |
| 1.76 | 18,000 | 19,500 |

EXAMPLE XIII

Amorphous, unoriented polyethylene terephthalate film was prepared as described in the first paragraph of Example I. The gauge or thickness of the film was between 40 and 45 mils. The unoriented film was stretched between 3X and 3.5X at a temperature between 85° C. and 95° C. in a tentering apparatus as described in Example I. At the end of the tentering apparatus, the film passed through a zone wherein the temperature was maintained at about 200° C. During this exposure which lasted for about 5 seconds, the film was maintained under constant tension.

The film was then allowed to cool to a temperature of 20° C. and was fed continuously at a rate of 2.8 feet/minute into the nip of two stainless steel calender rolls, each 8.5" diameter and 10" long. The rolls were internally heated with steam to a temperature of 152° C. During passage through the rolls the film was reduced in thickness from 13.4 mils to 8.2 mils and its length was increased in the longitudinal direction 1.64X. The film left the nip of the rolls at a speed of 4.8 feet/minute.

The film was tested for tensile strength, tensile modulus and elongation. The following results were obtained:

| Property | Longitudinal Direction | Transverse Direction |
| --- | --- | --- |
| Tensile Strength | 18,600 | 18,600 |
| Tensile Modulus | 641,000 | 572,000 |
| Percent Elongation | 62 | 113 |

EXAMPLE XIV

The amorphous film, 40–45 mils thick, of Example XIII was conducted through the tenter frame at a temperature of 85°–95° C. to stretch the film in the transverse direction between 3X and 3.5X. Thereafter the film was exposed to a temperature of about 200° C. for about 5 seconds while its dimensions were maintained constant and then allowed to cool. The film, now 14.0 mils thick and at a temperature of 20° C., was fed into the rolling mill at a temperature of 174° C. The thickness of the film was reduced in the mill to 8.1 mils and its length was increased 1.73X. The film was wound up at a speed of 4.5 feet/minute.

The final film displayed the following properties:

| Property | Longitudinal Direction | Transverse Direction |
| --- | --- | --- |
| Tensile Strength | 23,900 | 20,100 |
| Tensile Modulus | 766,000 | 640,000 |
| Percent Elongation | 46 | 135 |

EXAMPLES XV–XXII

Amorphous polyethylene terephthalate film stretched at a temperature of 85–95° C. between 3X and 3.5X in the transverse direction and heated to a temperature of about 200° C. in the manner described for Example XIII, was rolled in a direction perpendicular to the previous direction of stretch to increase its length from 1.5X to 1.6X at rolling temperatures shown in Table 6. The percent shrinkage was determined and the results indicated excellent dimensional stability for the film samples produced according to these examples as shown in Table 6.

TABLE 6

*Effect of rolling temperature on dimensional stability of film processed according to the invention*

| Example | Temperature of Rolling (° C.) | Dimensional Stability (Percent Shrinkage) | |
| --- | --- | --- | --- |
| | | LD | TD |
| XV | 140 | 2.5 | −1.1 |
| XVI | 144 | 2.5 | −1.3 |
| XVII | 153 | 1.3 | −1.1 |
| XVIII | 157 | 1.3 | −1.2 |
| XIX | 161 | 1.3 | 0 |
| XX | 170 | 1.4 | −2.4 |
| XXI | 174 | 1.3 | −1.2 |
| XXII | 175 | 1.3 | 0 |

EXAMPLES XXIII–XXV

The results of these examples are presented in Tables 7, 8 and 9 and are plotted in the accompanying Figures 4, 5 and 6, respectively. For these examples, substantially amorphous polyethylene terephthalate film was stretched from 3X to 3.5X in the transverse direction at a temperature between 85° C. and 95° C.; then exposed to a temperature of about 200° C. while the film was held under tension in all directions to crystallize the film; and thereafter the film was rolled in the apparatus described for Example XIII to increase the length of the film varying amounts between 1.2X and 2.2X at a temperature of about 170° C. for Example XXIII; about 155° C. for Example XXIV; and about 140° C. for Example XXV.

The tensile strengths or tenacities of the resulting films in both the transverse and longitudinal directions were determined and plotted versus the increase in length produced in the rolling step. It will be noted from Figures 4, 5 and 6 that despite the fact that the transverse directional stretch had been at least 3X, balanced tenacities in all cases were obtained where the length had been increased only about 1.6X in the rolling step.

TABLE 7

*Effect of amount of LD elongation by rolling on tensile strength of previously TD stretched film processed according to Example XXIII*

| LD Elongation Ratio | Tensile Strength | |
| --- | --- | --- |
| | LD | TD |
| 1.0 | 10,200 | 25,000 |
| 1.37 | 14,700 | 20,400 |
| 1.47 | 17,400 | 19,000 |
| 1.65 | 20,500 | 19,400 |
| 1.75 | 21,400 | 18,100 |
| 1.92 | 23,800 | 17,000 |
| 2.5 | 25,900 | 18,500 |

TABLE 8

*Effect of amount of LD elongation by rolling on tensile strength of previously TD stretched film processed according to Example XXIV*

| LD Elongation Ratio | Tensile Strength | |
| --- | --- | --- |
| | LD | TD |
| 1.22 | 12,000 | 25,000 |
| 1.52 | 13,300 | 21,900 |
| 1.55 | 18,900 | 21,100 |
| 1.7 | 20,700 | 20,300 |

TABLE 9

*Effect of amount of LD elongation by rolling on tensile strength of previously TD stretched film processed according to Example XXV*

| LD Elongation Ratio | Tensile Strength | |
| --- | --- | --- |
| | LD | TD |
| 1.0 | 10,300 | 25,100 |
| 1.25 | 12,900 | 22,700 |
| 1.42 | 15,200 | 22,000 |
| 1.5 | 16,900 | 21,200 |
| 1.71 | 19,600 | 20,200 |

EXAMPLE XXVI

Substantially amorphous polyethylene terephthalate film, 2.5 mils. thick, was stretched 3X in the transverse direction in a tentering apparatus at a temperature of 85°–90° C. The film was then exposed to a temperature of about 125° C. while the film was being held under tension in all directions in order to partially crystallize the film. Thereafter, the film was stretched 2.4X in the longitudinal direction in a nip roll stretching apparatus. The apparatus was composed of two sets of rotating rolls, one set consisting of a top rubber coated roll and a bottom chrome plated roll heated to a temperature of about 125° C., and the other set of rolls similar in construction to the first set, heated to a temperature of about 145° C. and rotating at a speed greater than that of the first set of rolls. The final thickness of the film was 0.3 mil. The physical properties were as follows:

| Property | Longitudinal Direction | Transverse Direction |
| --- | --- | --- |
| Tensile Strength | 19,000 | 18,500 |
| Tensile Modulus | 670,000 | 525,000 |
| Percent Shrinkage | +10.5 | +7.5 |
| Percent Elongation | 40 | 120 |

EXAMPLE XXVII

Example XXVI was repeated with an additional step. After the film had been elongated in the longitudinal direction in the nip roll stretching apparatus, it was passed through a nip roll heat-setting apparatus comprising a set of rolls rotating at the same speed as the last set of rolls in the stretching apparatus, said rolls being comprised of a top rubber-covered roll and a bottom chrome-plated roll heated to a temperature of 200° C. After passing through the nips of the heat-setting rolls, the film was quenched by passing it through the nips of a set of cold rolls rotating at substantially the same speed as the heat-setting rolls. Thereafter, the film was wound up on a wind-up roll. The percent shrinkage of the film as measured in both the longitudinal and transverse directions was reduced from 10.5% and 7.5% to 2.5% and 1.5%, respectively. The values for tensile strength, modulus and percent elongation remained essentially unchanged.

EXAMPLE XXVIII

This example relates to the production of oriented polyethylene terephthalate film having greatly enhanced unidirectional physical properties. Substantially amorphous polyethylene terephthalate film was stretched 3X in the transverse direction in a tenter frame apparatus at a temperature between 85° C. and 90° C. The film was then exposed to a temperature of about 200° C. while the film was being held under tension in all directions to crystallize the film. Thereafter, the film was stretched in the stretching apparatus described hereinbefore to an extent of 5X in the longitudinal direction at a temperature of 150° C. This sequence of steps produced a film which had a tensile modulus of 1,800,000 p.s.i., a tensile strength of 70,000 p.s.i. and an elongation of 12%, all properties measured in the longitudinal direction. These properties, representing a significant improvement over those of prior art films, serve to make this film an excellent base for conversion into industrial tapes of all varieties (pressure sensitive, sound recording, etc.) and for use in the manufacture of metallic yarns.

While the examples relate to the treatment of substantially amorphous polyethylene terephthalate film, the process of the invention is applicable to the treatment of other polymeric films. The only limitations imposed upon these films are: (1) they must be obtainable as substantially amorphous films at normal temperatures, and (2) they must be crystallizable by the application of heat. The following is a list, although by no means complete, of polymeric films for use in the present invention: polyethylene-2,6-naphthalate; polytetramethylene-1,2-dioxybenzoate; polyethylene-1,5-naphthalate; polyhexamethylene adipamide; polyhexamethylene sebacamide; polycaprolactam; and copolymers of ethylene terephthalate and ethylene isophthalate.

One very important aspect of the present invention, as shown in the examples, is the discovery that to produce a biaxially elongated film with improved properties, the substantially amorphous, crystallizable, polymeric film must be subjected to a heat treatment between the two elongation steps. This heat treatment serves to increase the crystallinity of the uni-directionally elongated polymeric film. It is believed that this heat treatment "locks in" uni-directional orientation and prevents its disruption during the subsequent elongation in a mutually perpendicular direction at an elevated temperature.

The particular methods used for elongating the film may be any of the conventional methods. Stretching by the use of moving, diverging clips or similar clamping devices or stretching between two sets of rolls by operating one set at a higher speed than the other, or rolling under pressure to reduce the thickness of the film and thus elongate the film, etc. may be used in either or both elongating steps. However, for a continuous operation, it is preferred to first stretch the film, as it moves continuously in a longitudinal direction, in the transverse direction by using the diverging clips in a tentering apparatus and then, after the heating or crystallization step, to elongate the film in the longitudinal direction at elevated temperature by either stretching or pressure rolling.

The temperatures involved in each of the elongating steps are critical to the present invention. The first elongating step is conducted between the second order transition temperature and a temperature of about 35° C. above it—for polyethylene terephthalate, about 70° C. to about 105° C. It is important to restrict the amount of crystallization that occurs during this step. By maintaining the temperature within the limits specified, the amount of work necessary and the likelihood of injuring the film are both kept at a minimum.

The heat-treating step is most conveniently performed in the same apparatus as used in the first elongating step. The temperature used must be below the crystalline melting temperature range but must be sufficiently high to at least partially crystallize the film, i.e., at least 25° C, above the temperature of the first elongating step. For polyethylene terephthalate, whose crystalline melting temperature range starts at about 250° C., a temperature selected from about 120° C. to about 200° C. is most useful. The greatest efficiency is achieved (the least elongation is required in the second elongating step to provide a "balanced" film) when this temperature lies between 150° C. and 200° C. However, for some purposes it may be desirable to use a temperature as low as 120° C. Thus, if a "balanced" but substantially thin film were desired, it could be obtained by heat-treating at the lower temperature and imposing more elongation in the subsequent elongation step. The exposure time during this step will depend on the rate of heat transfer. Depending on the type of equipment used, it may range from a fraction of a second to about 10 seconds or higher.

The temperature at which the final elongation step is performed determines the dimensional stability of the ultimate film. To obtain dimensional stability at any given temperature, i.e., usually at 150° C. or above, it is necessary that the film be raised to a temperature above the given temperature. However, the temperature of this step must be below the crystalline melting temperature range of the film. As the temperature of the film approaches the crystalline melting temperature range, the film tends to become slightly tacky. If the film is to be stretched over rolls in this step, the temperature must be watched carefully to avoid sticking of the film to the rolls. There are several factors which will affect the temperature of the film during this step. Besides the ambient temperature (the temperature of the rolls during rolling or the temperature of the surrounding atmosphere during stretching), the temperature of the film will be affected by the thickness of the film entering this step, the extent of stretch or thickness reduction imposed in this step, the speed of the rolls and the diameters of the rolls. For polyethylene terephthalate it has been found that with an ambient temperature from 140° C. to about 190° C., the final dimensional stability of the film as measured at 150° C. will be satisfactory for most purposes.

In cases where the film is subjected to a heat-treating temperature below the preferred temperature range, i.e., below 120° C. for polyethylene terephthalate film, the temperature of the final elongation step will necessarily be limited, i.e., to a range of 120°–150° C. for polyethylene terephthalate. However, dimensional stability at temperatures above this range of 120°–150° C. may be desired. To achieve this, an additional heat-setting step is necessary. This step may be carried out after the film has been elongated in the second direction and cooled to room temperature. The step comprises subjecting the film to a temperature of 150° C.–225° C. while holding the film under longitudinal restraint.

The process can be applied to polymeric films to which pigments, dyes, delusterants, etc., have been added. The use of coatings on the polymeric materials treated by the process of the present invention is also within the purview of the invention.

The invention is equally applicable to the use and production of thin and heavy gauge films. Hence, the starting material may have a thickness anywhere from 46 to 150 mils, and the material treated according to the process of the present invention may emerge with a thickness of as low as 0.2 to 1.5 mils. The thinner films, particularly the "balanced" films, may be used as packaging materials for food, cigarettes, hardware, etc. The heavier gauge films, particularly the "balanced" films, may be used as glass replacements, in glazing applications, as electrical insulators in high voltage uses and in the construction of heavy display boxes. The films possessing excellent uni-directional properties are very useful in such applications as magnetic sound recording tape, pressure sensitive tape, metallic yarn, etc.

Having fully disclosed the invention, what is claimed is:

1. A process for biaxially elongating polymeric film which comprises the steps, in sequence, of elongating a substantially amorphous, crystallizable, polymeric film selected from the group consisting of films of polyethylene terephthalate, polyhexamethylene, adipamide, polycaprolactam, polyhexamethylene sebacamide, polyethylene-2,6-naphthalate, polyethylene-1,5-naphthalate, polytetramethylene-1,2-dioxybenzoate and copolymers of ethylene terephthalate and ethylene isophthalate, said copolymers containing at least 70% ethylene terephthalate, in one direction at a temperature $T_1$ between the second order transition temperature of the film and about 35° C. above said transition temperature; thereafter, subjecting the film to a temperature within a range of about 25° C. above $T_1$ to just below the crystalline melting temperature range of the film while restricting dimensional change of the film; and thereafter, elongating the film in a direction at right angles to the direction of previous elongation at a temperature within a range of about 130° C. below to about 30° C. below the crystalline melting temperature range of the film.

2. A continuous process for biaxially elongating polymeric film which comprises the steps, in sequence, of stretching a substantially amorphous, crystallizable, polymeric film selected from the group consisting of films of polyethylene terephthalate, polyhexamethylene adipamide, polycaprolactam, polyhexamethylene sebacamide, polyethylene-2,6-naphthalate, polyethylene-1,5-naphthalate, polytetramethylene-1,2-dioxybenzoate and copolymers of ethylene terephthalate and ethylene isophthalate, said copolymers containing at least 70% ethylene terephthalate, in a direction transverse to the length of the film at a temperature $T_1$ between the second order transition temperature of the film and about 35° C. above said transition temperature; thereafter, subjecting the film to a temperature within a range of about 25° C. above $T_1$ to just below the crystalline melting temperature range of the film while restricting dimensional change of the film; and thereafter, elongating the film in the longitudinal direction at a temperature within a range of about 130° C. below to about 30° C. below the crystalline melting temperature range of the film.

3. A process for biaxially elongating polymeric film as in claim 1 wherein the elongation in the second direction is less than the elongation in the first direction to produce a film having substantially the same tensile properties in both directions.

4. A process as in claim 1 wherein the final elongation step is followed by a heat-setting step wherein the film is subjected to a temperature within a range of about 25° C. above $T_1$ to just below the crystalline melting temperature range of the film while restricting dimensional change of the film.

5. A process as in claim 2 wherein the elongation in the longitudinal direction is accomplished by stretching.

6. A process as in claim 2 wherein the elongation in the longitudinal direction is accomplished by rolling the film under pressure.

7. A process as in claim 2 wherein the elongation in the longitudinal direction is less than the elongation in the transverse direction to produce a film having substantially the same tensile properties in both directions.

8. A process as in claim 2 wherein the final elongation step is followed by a heat-setting step wherein the film is subjected to a temperature within a range of about 25° C. above $T_1$ to just below the crystalline melting temperature range of the film while restricting dimensional change of the film.

9. A process for biaxially elongating polyethylene terephthalate film which comprises the steps, in sequence, of elongating a substantially amorphous polyethylene terephthalate film in one direction at a temperature of 70°–105° C.; thereafter, subjecting the film to a temperature of 120°–250° C. while restricting dimensional change of the film; and thereafter, elongating the film in a direction at right angles to the direction of previous elongation at a temperature of 140°–190° C.

10. A process for biaxially elongating polyethylene terephthalate film as in claim 9 wherein the elongation in the second direction is less than the elongation in the first direction to produce a balanced polyethylene terephthalate film.

11. A process as in claim 9 wherein the final elongation step is followed by a heat-setting step wherein the film is subjected to a temperature of 120°–250° C. while restricting dimensional change of the film.

12. A process for biaxially elongating polyethylene terephthalate film which comprises the steps, in sequence, of elongating a substantially amorphous polyethylene terephthalate film in one direction at a temperature of 70°–105° C. at least 2X where X is the original dimension of the film; thereafter, subjecting the film to a temperature of 150°–250° C. while restricting dimensional change of the film; and thereafter, elongating the film in a direction at right angles to the direction of previous elongation at a temperature of 140°–190° C.

13. A process for biaxially elongating polyethylene terephthalate film which comprises the steps, in sequence, of elongating a substantially amorphous polyethylene terephthalate film in one direction at a temperature of 70°–105° C. from 2.5X to 4X where X is the original dimension of the film; thereafter, subjecting the film to a temperature of 150°–250° C. while restricting dimensional change of the film; and thereafter, elongating the film in a direction at right angles to the direction of previous elongation from 1.3X to 1.9X at a temperature of 140°–190° C.

14. A process for biaxially elongating polyethylene terephthalate film which comprises the steps, in sequence, of elongating a substantially amorphous polyethylene terephthalate film in one direction at a temperature of 70°–105° C. from 2.5X to 4X where X is the original dimension of the film; thereafter, subjecting the film to a temperature of 150°–250° C. while restricting dimensional change of the film; and thereafter, elongating the film in a direction at right angles to the direction of previous elongation from 4.5X to 5.5X at a temperature of 140°–190° C.

15. A continuous process for biaxially elongating polyethylene terephthalate film which comprises the steps, in sequence, of stretching a substantially amorphous polyethylene terephthalate film in a direction transverse to its length at a temperature of 70°–105° C. at least 2X where X is the original dimension of the film; thereafter, subjecting the film to a temperature of 150°–250° C. while restricting dimensional change of the film; and thereafter, elongating the film in the longitudinal direction at a temperature of 140°–190° C.

16. A process as in claim 15 wherein the elongation in the longitudinal direction is accomplished by stretching.

17. A process as in claim 15 wherein the elongation in the longitudinal direction is accomplished by rolling the film under pressure.

18. A process as in claim 15 wherein the elongation in the longitudinal direction is from 1.3X to 1.9X where X is the original length of the film.

19. A process as in claim 15 wherein the elongation in the longitudinal direction is from 4.5X to 5.5X where X is the original length of the film.

20. A process as in claim 15 wherein the final elongation step is followed by a heat-setting step wherein the film is subjected to a temperature of 120°–250° C. while restricting dimensional change of the film.

References Cited in the file of this patent

UNITED STATES PATENTS

| | | |
|---|---|---|
| 2,497,376 | Swallow et al. | Feb. 14, 1950 |
| 2,566,295 | Pace | June 12, 1951 |
| 2,763,029 | Tulloss | Sept. 18, 1956 |
| 2,823,421 | Scarlett | Feb. 18, 1958 |

UNITED STATES PATENT OFFICE
CERTIFICATION OF CORRECTION

Patent No. 2,968,065                          January 17, 1961

Le Roy Frederick Gronholz

It is hereby certified that error appears in the above numbered patent requiring correction and that the said Letters Patent should read as corrected below.

Column 1, line 60, for "temperature" read -- temperatures --; column 6, line 21, for "ploted" read -- plotted --; column 7, line 54, after "at a" insert -- speed of 2.5 feet/minute. The rolling mill was maintained at a --; column 8, TABLE 8, first column, second item thereof, for "1.52" read -- 1.51 --; column 9, line 18, for "mils." read -- mils --; column 11, line 66, after "polyhexamethylene" strike out the comma; column 12, line 29, list of references cited, for "2,566,295" read -- 2,556,295 --.

Signed and sealed this 6th day of June 1961.

(SEAL)
Attest:

ERNEST W. SWIDER
Attesting Officer

DAVID L. LADD
Commissioner of Patents